(12) United States Patent
Jeon et al.

(10) Patent No.: US 11,220,162 B2
(45) Date of Patent: Jan. 11, 2022

(54) DOOR FRAME FOR VEHICLES

(71) Applicants: Hyundai Motor Company, Seoul (KR); Kia Motors Corporation, Seoul (KR)

(72) Inventors: Dong Min Jeon, Suwon-si (KR); Kyung Dug Seo, Yongin-si (KR); Jae Wook Kim, Suwon-si (KR); Jee Hoon Seong, Gwangmyeong-si (KR); Kon Kim, Hwaseong-si (KR); Yong Hyun Nam, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 146 days.

(21) Appl. No.: 16/739,273

(22) Filed: Jan. 10, 2020

(65) Prior Publication Data

US 2021/0039484 A1 Feb. 11, 2021

(30) Foreign Application Priority Data

Aug. 8, 2019 (KR) .......................... 10-2019-0096462

(51) Int. Cl.
*B60J 5/04* (2006.01)
*B60J 10/76* (2016.01)
*B60R 13/04* (2006.01)

(52) U.S. Cl.
CPC ........... *B60J 5/0402* (2013.01); *B60J 5/0405* (2013.01); *B60R 13/04* (2013.01); *B60J 10/76* (2016.02)

(58) Field of Classification Search
CPC ...... B60J 5/0401; B60J 5/0402; B60J 5/0405; B60J 5/0406; B60J 10/76; B60R 13/04
See application file for complete search history.

(56) References Cited

U.S. PATENT DOCUMENTS

| 2003/0042756 | A1* | 3/2003 | Ogawa | ................. B60J 5/0406 |
| | | | | 296/146.9 |
| 2009/0195013 | A1* | 8/2009 | Suzuki | ................. B60R 13/04 |
| | | | | 296/146.5 |
| 2011/0099911 | A1* | 5/2011 | Ellis | ................. B60J 5/0402 |
| | | | | 49/493.1 |
| 2012/0174491 | A1* | 7/2012 | Clark | ................. B60J 10/74 |
| | | | | 49/490.1 |
| 2012/0192498 | A1* | 8/2012 | Fukui | ................. B60J 5/00 |
| | | | | 49/504 |

(Continued)

FOREIGN PATENT DOCUMENTS

KR 19980042678 U 9/1998

*Primary Examiner* — Gregory A Blankenship
(74) *Attorney, Agent, or Firm* — Slater Matsil, LLP (57) ABSTRACT

A door frame for a vehicle includes an inner frame configured such that a roof part corresponding to a roof of a vehicle body and a pillar part corresponding to a pillar of the vehicle body extend to be integrated with each other. A first outer frame is configured to extend along the roof part of the inner frame and to be coupled to the roof part so that a first glass run is fixed to the first outer frame. A second outer frame is configured to extend along the pillar part and to be coupled to the pillar part so that a second glass run is fixed to the second outer frame. The first glass run and the second glass run are both capable of absorbing impact when the door glass is inserted thereinto.

15 Claims, 4 Drawing Sheets

(56) References Cited

U.S. PATENT DOCUMENTS

| | | | |
|---|---|---|---|
| 2012/0198775 A1* | 8/2012 | Fukui | B60J 5/0463 49/504 |
| 2014/0246878 A1* | 9/2014 | Shimizu | B60J 5/0402 296/146.2 |
| 2015/0266364 A1* | 9/2015 | Im | B60J 10/86 49/495.1 |
| 2016/0031298 A1* | 2/2016 | Yoshihara | B60J 5/0402 296/146.2 |
| 2016/0200181 A1* | 7/2016 | Sato | B23K 11/14 296/146.2 |
| 2016/0214468 A1* | 7/2016 | Endo | B60R 13/04 |
| 2018/0133777 A1* | 5/2018 | Kimura | B60J 5/00 |
| 2018/0134128 A1* | 5/2018 | Takagi | B60J 5/0402 |
| 2018/0229670 A1* | 8/2018 | Bito | B60J 10/27 |
| 2019/0084387 A1* | 3/2019 | Smith | B60J 5/0402 |
| 2019/0143390 A1* | 5/2019 | Yamamoto | B21D 39/021 403/285 |
| 2019/0193540 A1* | 6/2019 | Kunapareddy | B60J 10/75 |
| 2020/0122558 A1* | 4/2020 | Seong | B60J 10/76 |
| 2020/0189366 A1* | 6/2020 | Choi | E05F 15/697 |
| 2020/0307364 A1* | 10/2020 | Nojiri | B60J 10/50 |
| 2020/0362611 A1* | 11/2020 | Ishiguro | E05F 11/423 |
| 2021/0031599 A1* | 2/2021 | Nojiri | B60J 10/50 |
| 2021/0039484 A1* | 2/2021 | Jeon | B60J 5/0402 |
| 2021/0178867 A1* | 6/2021 | Fukatami | B60J 5/04 |
| 2021/0206239 A1* | 7/2021 | Ishiguro | B60J 1/17 |

* cited by examiner

DOOR FRAME FOR VEHICLES

CROSS-REFERENCE TO RELATED APPLICATIONS

This application claims priority to Korean Patent Application No. 10-2019-0096462, filed in the Korean Intellectual Property Office on Aug. 8, 2019, which application is hereby incorporated herein by reference.

TECHNICAL FIELD

The present invention relates to a door frame for vehicles.

BACKGROUND

In general, a door for vehicles is provided with a door window to improve ventilation of the interior of a vehicle and visibility and habitability of passengers, and is usually formed of a steel material in consideration of stability against collision or the like.

That is, a door outer panel and a door inner panel which are formed of a steel material are coupled to each other to form a door structure, a door frame is coupled to the upper portions of the panels to form a door window, and a door module provided with a regulator to raise and lower door window glass, etc., is installed within an inner space formed by coupling the door outer panel and the door inner panel to each other.

Further, a door trim as an interior material, in which a door switch, a window switch or the like is installed, is coupled to the door inner panel, and an impact beam is installed close to the door outer panel so as to increase rigidity against side collision of the door.

As a molding and a glass run are integrated, such a conventional door essentially requires a separate garnish structure and thus increase in cost and weight is caused, and alternatively, if a molding and a pillar part are separately provided, the number of components is excessively increased and poor quality is caused.

The above description has been provided to aid in understanding of the background of the present invention and should not be interpreted as conventional technology known to those skilled in the art.

SUMMARY

The present invention relates to a door frame for vehicles, for example, in which poor quality can be overcome through reduction in weight and cost and improvement in assemblability. Embodiments have been made in view of the above problems and can provide a door frame for vehicles in which a sealing structure is simplified so as to cause reduction in cost and weight by separating a frame molding and a glass run from each other, and an integrated structure of a frame prevents a defect in assembly, caused by the excessive number of components, so as to cause improvement in quality.

In accordance with the present invention, a door frame for vehicles includes an inner frame configured such that a roof part corresponding to a roof of a vehicle body and a pillar part corresponding a pillar of the vehicle body extend to be integrated with each other. A first outer frame is configured to extend along the roof part of the inner frame and to be coupled to the roof part so that a first glass run for absorbing impact when a door glass is inserted thereinto is fixed to the first outer frame. A second outer frame is configured to extend along the pillar part and to be coupled to the pillar part so that a second glass run for absorbing impact when the door glass is inserted thereinto is fixed to the second outer frame.

The roof part may include a first roof frame configured to be bent and a second roof frame configured to form a hollow with the first roof frame when the second roof frame is coupled to the first roof frame and to receive the first glass run, and a molding coupling part may extend to the first roof frame and the second roof frame.

One end of the molding coupling part may be connected to the first roof frame and the second roof frame in a state in which the end of the molding coupling part is interposed between the first roof frame and the second roof frame.

The first outer frame may be bent so as to surround the molding coupling part, and have a first support end to which a first protrusion protruding from the first glass run is fastened when the first outer frame is coupled with the molding coupling part.

A hook configured to extend in a loop type may be formed at the molding coupling part, a second support end configured to be bent and extend from the other end of the first outer frame opposite to the first support end may be formed at the first outer frame, and a strip may be fixedly fastened to the hook and the second support end.

The second roof frame in a coupled state to the first roof frame may be dented toward the hollow, and thus form a fastened part to which a second protrusion protruding from the first glass run is connected so as to be fastened thereto.

The first roof frame and the second roof frame may be manufactured through a press forming process, and the first outer frame may be manufactured through a roll forming process.

The pillar part may include a first pillar frame configured to be bent and a second pillar frame configured to be coupled to the first pillar frame to form an inner space and to receive the second glass run, and the second outer frame may be coupled to the first pillar frame and the second pillar frame to close the inner space formed by the first pillar frame and the second pillar frame.

One end of the second outer frame may be coupled to the second pillar frame, the other end of the second outer frame may be coupled to the first pillar frame, the one end may be folded toward the outer end so as to form a projection, a first extension protruding from the second glass run may be fastened to the projection, and thereby, a position of the second glass run may be fixed.

After formation of the projection, the one end of the second outer frame may extend to have an overlap section with the second pillar frame.

The other end of the second outer frame may be bent to surround the first pillar frame.

The second pillar frame in a coupled state to the first pillar frame may be bent to be dented toward the inner space so as to form a fixing part to which a second extension protruding from the second glass run is connected so as to be fastened thereto.

The first pillar frame and the second pillar frame may be manufactured through a press forming process, and the second outer frame may be manufactured through a roll forming process.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a door frame for vehicles in accordance with one embodiment of the present invention will be described with reference to the accompanying drawings.

Figure 1:
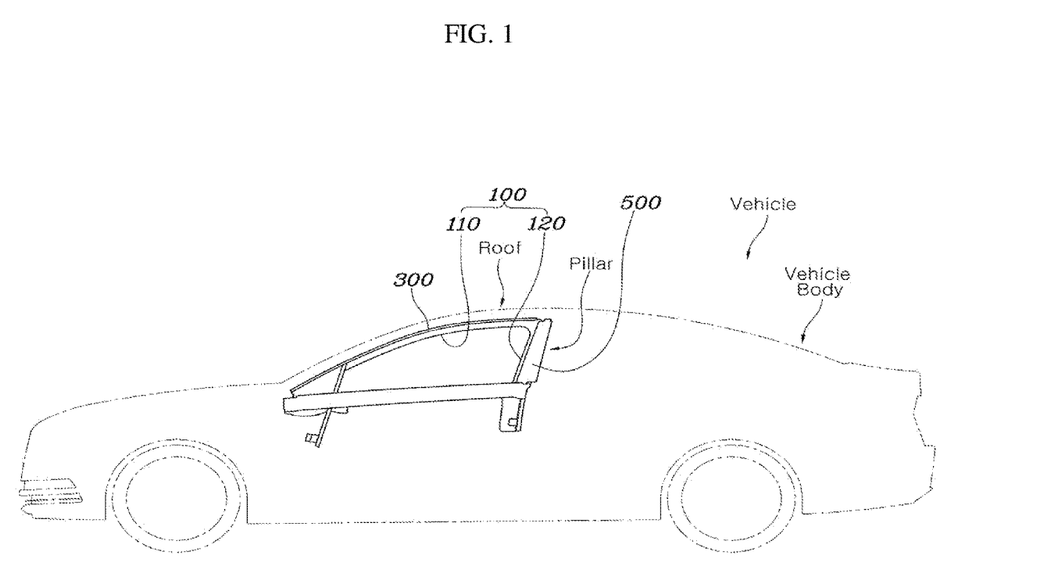
FIG. 1 is a view illustrating a door frame for vehicles in accordance with the present invention.
Figure 2:
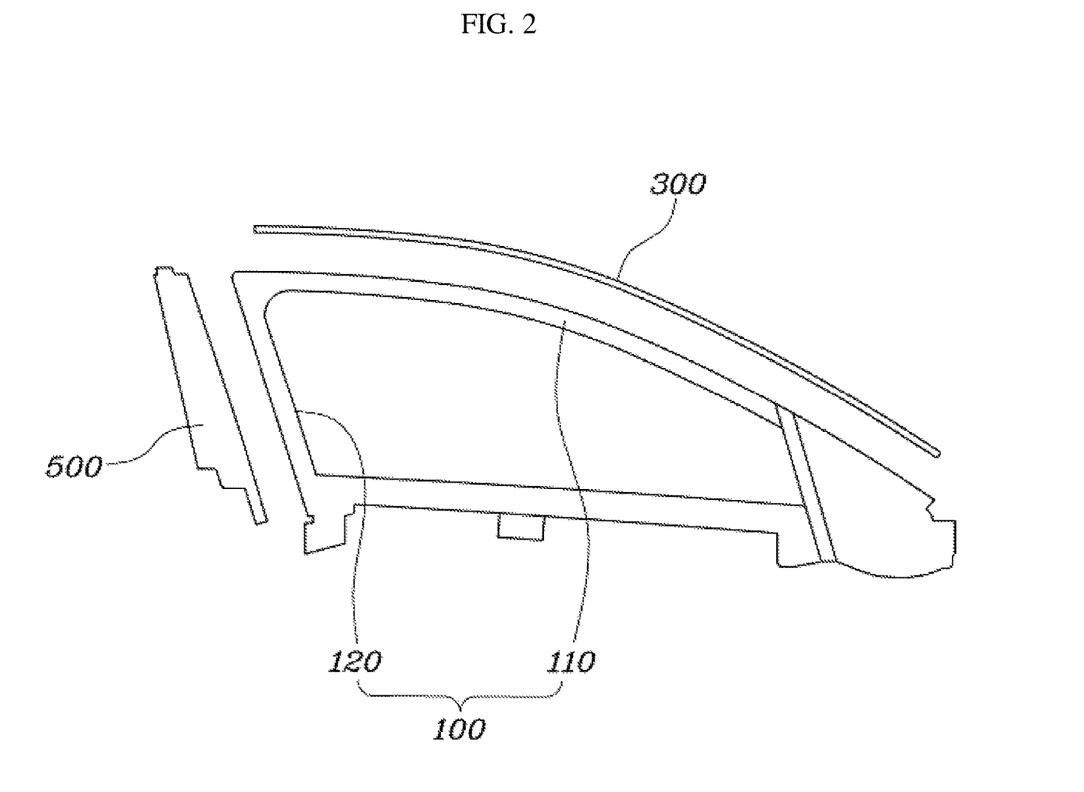
FIG. 2 is an exploded view of the door frame for vehicles shown in FIG. 1.
Figure 3:
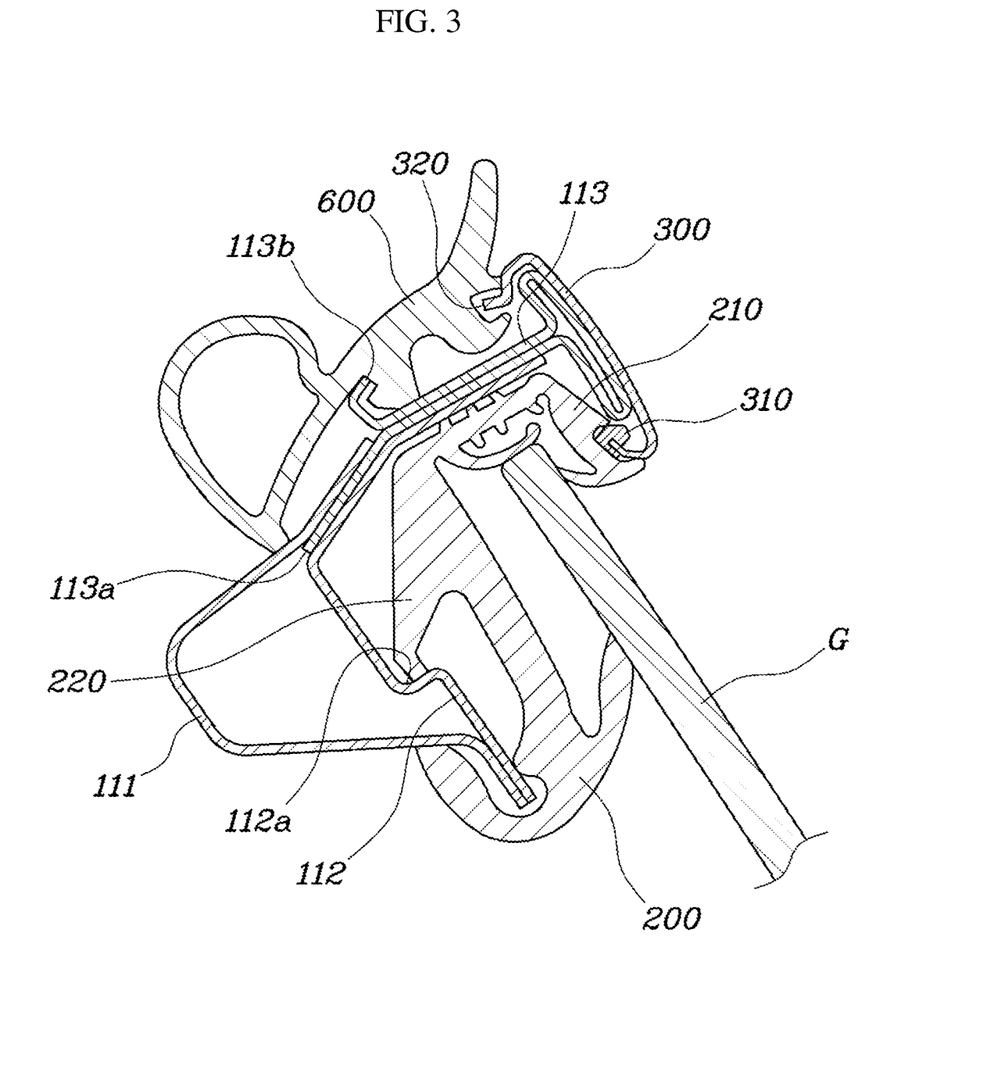
FIGS. 3 and 4 are views illustrating the door frame for vehicles shown in FIG. 1.
Figure 4:
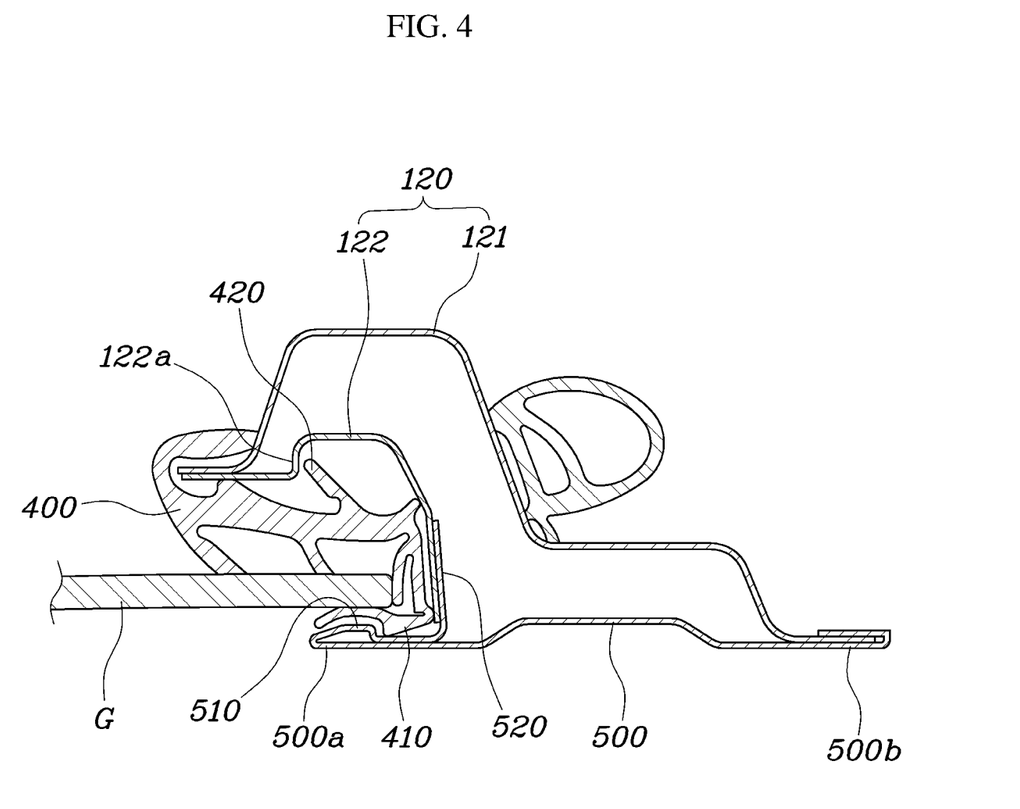

FIG. 1 is a view illustrating a door frame for vehicles in accordance with the present invention, FIG. 2 is an exploded view of the door frame for vehicles shown in FIG. 1, and FIGS. 3 and 4 are views illustrating the door frame for vehicles shown in FIG. 1

The door frame for vehicles in accordance with the present invention includes, as shown in FIGS. 1 and 2, an inner frame 100 which is configured such that a roof part no corresponding to a roof of a vehicle body and a pillar part 120 corresponding a pillar of the vehicle body extend to be integrated with each other, a first outer frame 300 which extends along the roof part no of the inner frame 100 and is coupled to the roof part no so that a first glass run 200 for absorbing impact when a door glass G is inserted thereinto is fixed to the first outer frame 300, and a second outer frame 500 which extends along the pillar part 120 and is coupled to the pillar part 120 so that a second glass run for absorbing impact when the door glass G is inserted thereinto is fixed to the second outer frame 500.

As such, the door frame for vehicles in accordance with the present invention includes the inner frame 100, the first outer frame 300 and the second outer frame 500, and the inner frame 100 is configured such that the roof part no and the pillar part 120 extend to be integrated with each other. Thereby, the roof part no and the pillar part 120 have the same sectional shape and thus respective cross-sections thereof may form a smooth connection structure at a bent region corresponding to a connection region between the roof part no and the pillar part 120, and the roof part no and the pillar part 120 are integrally connected to each other and thus, the number of components may be reduced and poor quality in assembly may be overcome.

Further, the inner frame 100 may further include a line part 600 which extends rectilinearly so as to connect the lower ends of the roof part no and the pillar part 120 to each other.

As such, the inner frame 100 is formed as one component, the first outer frame 300 corresponding to the roof part no and the second outer frame 500 corresponding to the pillar part 120 are divided from each other, and thus, the structure of the door frame is simplified and assembly efficiency of the door frame is enhanced through assembly of the first and second glass runs 200 and 400 through the respective outer frames 300 and 500.

A glass run is configured to cushion impact when a door glass is moved and simultaneously to surround the door glass to form a sealing structure. Such a glass run is formed of rubber, and is provided with a plurality of adhesion protrusions for adhesion to the door glass.

Particularly, in the present invention, the inner frame wo is formed as one component through a press forming process, and the first and second outer frames 300 and 500 may be formed to have a shape to which the respective glass runs 200 and 400 are fixed, through a roll forming process. Thereby, the inner frame 100, which is formed using a press mold, may be produced as a uniform product having a high degree of precision, and the first and second outer frames 300 and 500, which are formed as the shape to which the respective glass runs 200 and 400 are fixed, through the roll forming process and are coupled to the inner frame 100, may be produced as products having improved productivity.

In the present invention, in more detail, as shown in FIG. 3, the roof part no may include a first roof frame in which is bent, and a second roof frame 112 which forms a hollow with the first roof frame in, when the second roof frame 112 is coupled to the first roof frame in, and is configured to receive the first glass run 200, and a molding coupling part 113 may extend to the first roof frame in and the second roof frame 112.

As such, the roof part no includes the first roof frame in and the second roof frame 112, and when the first roof frame in and the second roof frame 112 are coupled to each other, the hollow is formed, thus increasing rigidity of the roof part no. The first roof frame in and the second roof frame 112 may be manufactured through the press forming process and then be coupled to each other, and the molding coupling part 113 may be coupled to the first roof frame in and the second roof frame 112. The molding coupling part 113 may be formed to match the external shape of the vehicle using one plate member through the roll forming process, and one end 113a of the molding coupling part 113 may be connected to the first roof frame in and the second roof frame 112 in a state in which the end 113a is interposed between the first roof frame in and the second roof frame 112, and thus be firmly fixed to the first roof frame in and the second roof frame 112. The roof part no of the inner frame 100 is formed by integrating the first roof frame in, the second roof frame 112 and the molding coupling part 113, and the first glass run 200 received in the second roof frame 112 is fixed through the first outer frame 300.

In more detail, the first outer frame 300 is bent so as to surround the molding coupling part 113, and may be provided with a first support end 310 to which a first protrusion 210 protruding from the first glass run 200 is fastened when the first outer frame 300 is coupled to the molding coupling part 113.

As shown in FIG. 3, the first outer frame 300 may be bent so as to surround a portion of the molding coupling part 113 which is exposed to the outside, and thus be formed to have the external shape of the vehicle body. Since the first glass run 200 must be fixed to the first outer fame 300, one end of the first outer frame 300 is bent and thus form the first support end 310, the first protrusion 210 which is fastened to the first support end 310 is formed on the first glass run 200, the first protrusion 210 is fastened to the first support end 310 in the state in which the first glass run 200 is received in the second roof frame 112, and thereby, the position of the first glass run 200 may be fixed.

Further, the second roof frame 112 in the coupled state to the first roof frame 111 is dented toward the hollow, thus forming a fastened part 112a to which a second protrusion 220 protruding from the first glass run 200 is fastened.

As such, the second roof frame 112 is bent to form the fastened part 112a which is dented toward the hollow when the second roof frame 112 is coupled to the first roof frame in, and thus, the second protrusion 220 of the first glass run 200 is fastened to the fastened part 112a so as to be fixed. Here, the second roof frame 112 is manufactured to have the fastened part 112a through the press forming process, and thereby, a separate process for forming the fastened part 112a is not necessary and the second roof frame 112 having the fastened part 112a may be formed through the press forming process.

As described above, when the first glass run 200 is fixed to the roof part no, the first protrusion 210 is connected to the first support end 310 of the first outer frame 300 so as to be fastened thereto, the second protrusion 220 is connected to the fastened part 112a of the second roof frame 112 so as to be fastened thereto, and thus, the fixed state of the position of the first glass run 200 to the roof part no may be firmly maintained.

A hook 113b which extends in a loop type is formed at the molding coupling part 113, a second support end 320 which is bent and extends from the other end of the first outer frame 300 opposite to the first support end 310 is formed at the first outer frame 300, and a strip 600 may be fixedly fastened to the hook 113b and the second support end 320.

Here, the strip 600 is pressed against the vehicle body and the molding coupling part 113, and is provided on the roof part no so as to hermetically seal a gap between the vehicle body and the molding coupling part 113.

In order to fix this strip 600, the loop-type hook 113b is formed at the molding coupling part 113, and the second support end 320 which is bent and extends is formed at the first outer frame 300. Here, the molding coupling part 113 is formed by folding one plate member, and the hook 113b may be formed by bending one end of the plate member. Further, the first outer frame 300 is located at the other end of the molding coupling part 113 opposite to the end thereof provided with the hook 113b, and the other end of the first outer frame 300 is bent toward the hook 113b and thus forms the second support end 320.

Thereby, the hook 113b of the molding coupling part 113 and the second support end 320 of the first outer frame 300 protrude in directions facing each other, and the strip 600 is inserted between the hook 113b and the second support end 320 and is thus fixed. Grooves may be formed in the strip 600 so that the hook 113b and the second support end 320 are inserted into the grooves.

As shown in FIG. 4, the pillar part 120 may include a first pillar frame 121 which is bent, and a second pillar frame 122 which is coupled to the first pillar frame 121 to form an inner space and is configured to receive the second glass run 400, and the second outer frame 500 may be coupled to the first pillar frame 121 and the second pillar frame 122 to close the inner space formed by the first pillar frame 121 and the second pillar frame 122.

As such, the pillar part 120 includes the first pillar frame 121 and the second pillar frame 122, the inner space is formed when the first pillar frame 121 and the second pillar frame 122 are coupled to each other, and the second outer frame 500 is coupled to the first pillar frame 121 and the second pillar frame 122 so as to close the inner space and thus forms a hollow, thereby increasing rigidity of the pillar part 120.

The first pillar frame 121 and the second pillar frame 122 may be manufactured through the press forming process and then be coupled to each other, and the second outer frame 500 may be formed through the roll forming process and then coupled to the first pillar frame 121 and the second pillar frame 122. As such, the pillar part 120 of the inner frame 100 includes the first pillar frame 121 and the second pillar frame 122, and the second outer frame 500 closes the inner space formed by the first pillar frame 121 and the second pillar frame 122 and thus forms the hollow.

Here, one end 500a of the second outer frame 500 is coupled to the second pillar frame 122, the other end 500b is coupled to the first pillar frame 121, the end 500a is folded toward the other end 500b to form a projection 510, a first extension 410 protruding from the second glass run 400 is fastened to the projection 510, and thereby, the position of the second glass run 400 may be fixed.

As such, the projection 510 is formed by applying a hemming structure, formed by folding the end 500a of the second outer frame 500 toward the other end 500b, the first extension 410 protruding from the second glass run 400 is fastened to the projection 510, and thus, the position of the second glass run 400 is fixed. Such a second outer frame 500 having the projection 510 formed by the hemming structure may be formed through the roll forming process, and the second outer frame 500 and the second pillar frame 122 form a space in which the second glass run 400 is received. The end 500a of the second outer frame 500 is folded to form the projection 510, the remaining extension part of the end 500a is coupled to the second pillar frame 122, and the other end 500b is coupled to the first pillar frame 121. Further, the first extension 410 is fastened to the projection 510 in the state in which the second glass run 400 is received between the second pillar frame 122 and the second outer frame 500, and thus, the position of the second glass run 400 may be fixed.

After formation of the projection 510, the end 500a of the second outer frame 500 may extend to have an overlap section 510 with the second pillar frame 122.

As shown in FIG. 4, after formation of the projection 510, the end 500a of the second outer frame 500 may extend toward the second pillar frame 122, and thus, the overlap section 510 between the end 500a of the second outer frame 500 and the second pillar frame 122 is formed. In the overlap section 520, the end 500a of the second outer frame 500 and the second pillar frame 122 may be coupled to each other by welding, the second outer frame 500 and the second pillar frame 122 may be coupled to each other through the overlap section 520 having a designated area, and thereby, the firm coupling state therebetween may be maintained.

Further, the second pillar frame 122 in the coupled state to the first pillar frame 121 is bent to be dented toward the inner space, thus forming a fixing part 122a to which a second extension 420 protruding from the second glass run 240 is connected to be fastened thereto.

As such, the second pillar frame 122 is bent to form the fixing part 122a which is dented toward the inner space when the second pillar frame 122 is coupled to the first pillar frame 121, and thus, the second extension 420 protruding from the second glass run 400 is fastened to the fixing part 122a so as to be fixed. Here, the second pillar frame 122 is manufactured to have the fixing part 122a through the press forming process, and thereby, a separate process for forming the fixing part 122a is not necessary and the second pillar frame 122 having the fixing part 122a may be formed through the press forming process.

As described above, when the second glass run 400 is fixed to the pillar part 120, the first extension 410 is connected to the projection 510 of the second outer frame 500 so as to be fastened thereto, the second extension 420 is connected to the fixing part 122a of the second pillar frame 122 so as to be fastened thereto, and thus, the fixed state of the position of the second glass run 400 to the pillar part 120 may be firmly maintained.

Further, the other end 500b of the second outer frame 500 is bent to surround the first pillar frame 121, and thus, a contact area of the other end 500b of the second outer frame 500 with the first pillar frame 121 may be increased and the firm coupling state therebetween may be maintained.

Thereby, in the present invention, the inner frame 100 is formed as one integrated component, the conventional problems caused by poor quality in assembly are overcome, and the number of component is reduced, and thus, reduction in cost and weight is achieved. Further, the inner frame 100 of the door frame is manufactured using a press mold, and thus, productivity and a degree of precision of the door frame are increased.

As is apparent from the above description, a door frame for vehicles having the above-described structure in accordance with the present invention simplifies a sealing structure and thus achieves reduction in cost and weight by separating a frame molding and a glass run from each other, and prevents a defect in assembly, caused by the excessive number of components, through an integrated structure of a frame and thus achieves improvement in quality. Further, the door frame is manufactured using a press mold, and may thus be produced with increased productivity and a high degree of precision.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A door frame for a vehicle, the door frame comprising:
    an inner frame configured such that a roof part corresponding to a roof of a vehicle body and a pillar part corresponding to a pillar of the vehicle body extend to be integrated with each other;
    a first outer frame configured to extend along the roof part of the inner frame and to be coupled to the roof part so that a first glass run is fixed to the first outer frame, the first glass run capable of absorbing impact when a door glass is inserted thereinto; and
    a second outer frame configured to extend along the pillar part and to be coupled to the pillar part so that a second glass run is fixed to the second outer frame, the second glass run capable of absorbing impact when the door glass is inserted thereinto, wherein
        the roof part comprises a first roof frame configured to be bent and a second roof frame configured to form a hollow with the first roof frame when the second roof frame is coupled to the first roof frame and to receive the first glass run, and
        a molding coupling part extends to the first roof frame and the second roof frame.

2. The door frame according to claim 1, wherein one end of the molding coupling part is connected to the first roof frame and the second roof frame in a state in which the end of the molding coupling part is interposed between the first roof frame and the second roof frame.

3. The door frame according to claim 1, wherein the first outer frame is bent so as to surround the molding coupling part and has a first support end to which a first protrusion protruding from the first glass run is fastened when the first outer frame is coupled with the molding coupling part.

4. The door frame according to claim 3, wherein a hook configured to extend in a loop type is formed at the molding coupling part, wherein a second support end configured to be bent and extend from the other end of the first outer frame opposite to the first support end is formed at the first outer frame, and wherein a strip is fixedly fastened to the hook and the second support end.

5. The door frame according to claim 1, wherein the second roof frame in a coupled state to the first roof frame is dented toward the hollow and forms a fastened part to which a second protrusion protruding from the first glass run is connected so as to be fastened thereto.

6. The door frame according to claim 1, wherein the first roof frame and the second roof frame are manufactured through a press forming process, and the first outer frame is manufactured through a roll forming process.

7. The door frame according to claim 1, wherein:
    the pillar part comprises a first pillar frame configured to be bent, and a second pillar frame configured to be coupled to the first pillar frame to form an inner space and to receive the second glass run; and
    the second outer frame is coupled to the first pillar frame and the second pillar frame to close the inner space formed by the first pillar frame and the second pillar frame.

8. The door frame according to claim 7, wherein one end of the second outer frame is coupled to the second pillar frame, the other end of the second outer frame is coupled to the first pillar frame, the one end is folded toward the outer end so as to form a projection, a first extension protruding from the second glass run is fastened to the projection, and a position of the second glass run is fixed.

9. The door frame according to claim 8, wherein, after formation of the projection, the one end of the second outer frame extends to have an overlap section with the second pillar frame.

10. The door frame according to claim 8, wherein the other end of the second outer frame is bent to surround the first pillar frame.

11. The door frame according to claim 7, wherein the second pillar frame in a coupled state to the first pillar frame is bent to be dented toward the inner space so as to form a fixing part to which a second extension protruding from the second glass run is connected so as to be fastened thereto.

12. The door frame according to claim 7, wherein the first pillar frame and the second pillar frame are manufactured through a press forming process, and the second outer frame is manufactured through a roll forming process.

13. A vehicle comprising:
    vehicle body having a roof and a pillar;
    an inner frame configured such that a roof part corresponding to the roof of the vehicle body and a pillar part corresponding to the pillar of the vehicle body extend to be integrated with each other;
    a first outer frame configured to extend along the roof part of the inner frame and to be coupled to the roof part so that a first glass run is fixed to the first outer frame, the first glass run capable of absorbing impact when a door glass is inserted thereinto; and
    a second outer frame configured to extend along the pillar part and to be coupled to the pillar part so that a second glass run is fixed to the second outer frame, the second glass run capable of absorbing impact when the door glass is inserted thereinto, wherein the roof part comprises a first roof frame configured to be bent and a second roof frame configured to form a hollow with the first roof frame when the second roof frame is coupled to the first roof frame and to receive the first glass run, and wherein a molding coupling part extends to the first roof frame and the second roof frame.

14. The vehicle according to claim 13, wherein:
the pillar part comprises a first pillar frame configured to be bent, and a second pillar frame configured to be coupled to the first pillar frame to form an inner space and to receive the second glass run; and
the second outer frame is coupled to the first pillar frame and the second pillar frame to close the inner space formed by the first pillar frame and the second pillar frame.

15. The vehicle according to claim 14, wherein one end of the second outer frame is coupled to the second pillar frame, the other end of the second outer frame is coupled to the first pillar frame, the one end is folded toward the outer end so as to form a projection, a first extension protruding from the second glass run is fastened to the projection, and a position of the second glass run is fixed.

* * * * *